United States Patent [19]

Avis

[11] Patent Number: 4,820,992

[45] Date of Patent: Apr. 11, 1989

[54] CLOCK SIGNAL MULTIPLEXERS

[75] Inventor: Richard J. A. Avis, Sherfield Park, United Kingdom

[73] Assignee: Sony Corporation, Tokyo, Japan

[21] Appl. No.: 119,392

[22] Filed: Nov. 10, 1987

[30] Foreign Application Priority Data

Nov. 20, 1986 [GB] United Kingdom ............... 8627793

[51] Int. Cl.[4] ............... H04Q 3/00; H03K 17/00; H03K 1/17
[52] U.S. Cl. ............... 328/137; 328/154; 328/63; 328/72; 307/269
[58] Field of Search ............... 328/137, 154, 63, 72, 328/104; 307/269, 243

[56] References Cited

U.S. PATENT DOCUMENTS

| | | | |
|---|---|---|---|
| 3,061,815 | 10/1962 | Tomes | 328/137 |
| 4,214,213 | 7/1980 | Ferrie | 328/154 |
| 4,229,699 | 10/1980 | Frissell | 328/63 |
| 4,308,598 | 12/1981 | Mahmood | 307/243 |
| 4,521,810 | 6/1985 | Nigborowicz et al. | 328/104 |
| 4,651,103 | 3/1987 | Grimes | 328/154 |

Primary Examiner—Stanley D. Miller
Assistant Examiner—Timothy P. Callahan
Attorney, Agent, or Firm—Lewis H. Eslinger

[57] ABSTRACT

A clock signal multiplexer for combining a plurality n of input clock signals of the same frequency but differing phases into a single channel, by selectively passing one of the n input clock signals to an output of the multiplexer to the exclusion of the other n−1 input clock signals, includes n input circuits to each of which a respective one of the n input signals is supplied together with a respective clock enable signal, a logic circuit coupling the input circuits to a signal synchronizer, the logic circuit operating to enable said signal synchronizer in respect of the input clock signal corresponding to that one of the n clock enable signals which is in a select condition, and further operating on return of the one of said clock enable signals to a non-select condition and transition of another of the clock signals to the select condition to disable the signal synchronizer in respect of the previously selected input clock signal, and to enable the signal synchronizer in respect of the input clock signal corresponding to the other clock enable signal, a clock signal selector to which the input clock signals are supplied and to which the signal synchronizer is connected, the signal synchronizer enabling the clock signal selector to pass the enabled input clock signal to the output of the multiplexer via a clock regenerator.

6 Claims, 5 Drawing Sheets

CLOCK SIGNAL MULTIPLEXERS

BACKGROUND OF THE INVENTION

1. Field of the Invention

This invention relates to clock signal multiplexers.

2. Description of the Prior Art

The need to multiplex a plurality of clock signals together, that is, to combine the clock signals serially into a single channel by selectively passing one of the clock signals to the exclusion of the others, arises in various circuits. Consider, for example, a digital video tape recorder which is deriving four binary data signals via respective reproducing heads, where all four data signals are to be stored a single memory, such as a field store. In this case, a respective clock signal will be derived from each reproduced data signal for use in controlling the memory when that data signal is to be stored. All four clock signals are of the same frequency, and ideally they will remain in a constant phase relationship, but in practice, due to jitter, this may not be so, and as a consequence there may be a clash of control of the memory.

In these and other circuits there is, therefore, a requirement for a clock signal multiplexer capable of multiplexing a plurality of clock signals of the same frequency but differing phases, to provide a signal output clock signal, with the assurance that the output clock signal will always be continuous, and will always contain complete clock cycles and be glitch-free. Previously proposed clock signal multiplexers, such as simple switching devices, do not provide these assurances.

SUMMARY OF THE INVENTION

One object of the present invention is to provide a clock signal multiplexer for combining a plurality of input clock signals such that the output clock signal is continuous.

Another object of the present invention is to provide a clock signal multiplexer for combining a plurality of input clock signals such that the output clock signal always contains complete clock cycles.

Another object of the present invention is to provide a clock signal multiplexer for combining a plurality of input clock signals such that the output clock signal is glitch-free.

Another object of the present invention is to provide a clock signal multiplexer for combining a plurality of input clock signals such that the output clock signal is suitable for controlling a memory.

According to the present invention there is provided a clock signal multiplxer for combining a plurality n of input clock signals of the same frequency but differing phases into a single channel, by selectively passing one of said n input clock signals to an output of the multiplexer to the exclusion of the other n−1 input clock signals, the multiplexer comprising:

n input circuits to each of which a respective one of said n input clock signals is supplied together with a respective clock enable signal;

a logic circuit coupling said input circuits to a signal synchronizer, said logic circuit operating to enable said signal synchronizer in respect of the input clock signal corresponding to that one of said n clock enable signals which is in a select condition, and further operating on return of said one of said clock signals to a non-select condition and transition of another of said clock enable signal to the select condition to disable said signal synchronizer in respect of the previously selected input clock signal, and to enable said signal synchronizer in respect of the input clock signal corresponding to said other clock enable signal; and a clock signal selector to which said input clock signals are supplied and to which said signal synchronizer is connected, said signal synchronizer enabling said clock signal selector to pass the enabled said input clock signal to said output of the multiplexer.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
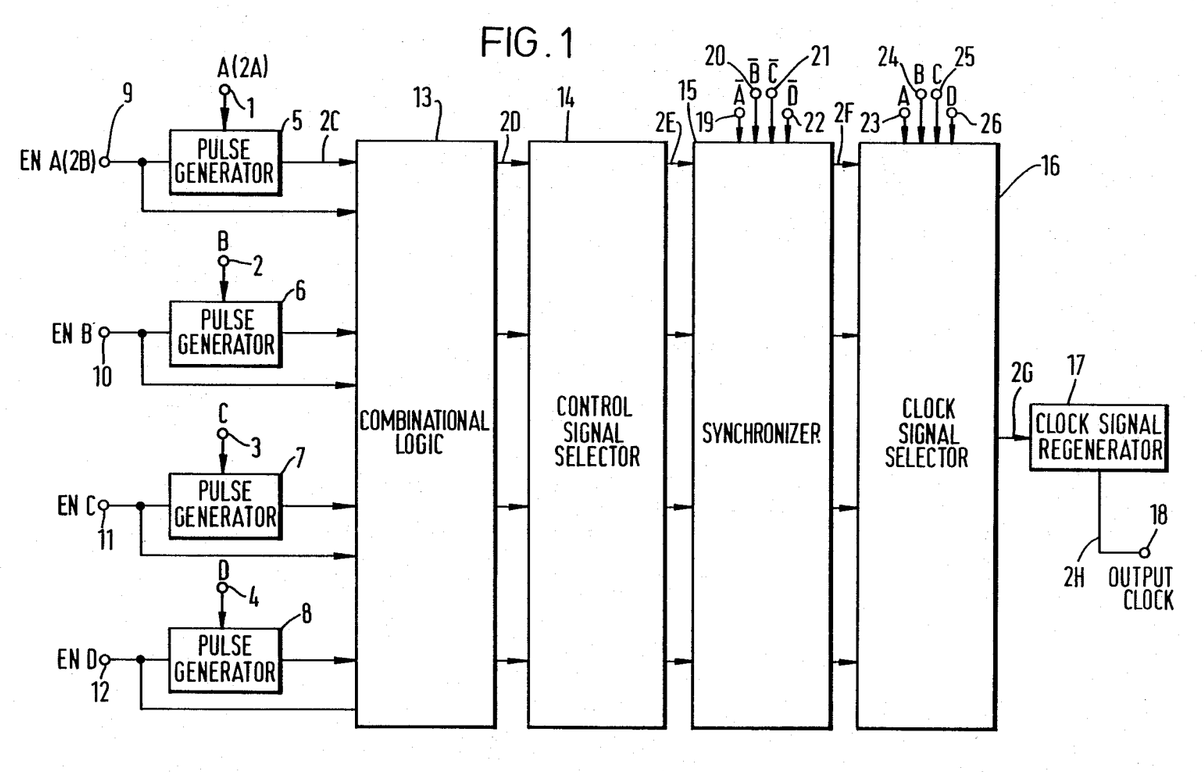
FIG. 1 shows in block form a first embodiment of clock signal multiplexer according to the present invention.

Referring to FIG. 1, the first embodiment of clock signal multiplexer to be described is to be used to multiplex four input clock signals A, B, C and D which are all of the same frequency, but which may vary in phase relative to each other. The input clock signals A to D may, for example, be respectively derived from four reproduced signals supplied by four heads of a digital video tape recorder; it being required that any selected one of the input clock signals A to D be supplied to an output, for example to control a data store, such as a field store, and that the output clock signal should be continuous, should only contain complete clock cycles, and should be glitch-free even when switching from one of the input clock signals A to D to another.

The clock signal multiplexer comprises four input terminals 1 to 4 to which the input clock signals A to D respectively are supplied, and which are respectively connected to the clock terminals of four pulse generators 5 to 8. To the pulse generators 5 to 8 are also respectively connected four further input terminals 9 to 12 to which are respectively supplied clock enable signals A to D which, as explained below, control selection of which of the input clock signals A to D is to form the output clock signal of the clock signal multiplexer. Where some plurality of clock signals other than four are to be multiplexed, then the elements of the clock signal multiplexer so far mentioned are each provided that plurality of times.

The outputs of the pulse generators 5 to 8 are connected to a combinational logic circuit 13, to which are also supplied the clock enable signals A to D from the input terminals 9 to 12. The logic circuit 13 supplies four outputs to a control signal selector 14, which supplies four outputs to a synchronizer 15, which in turn supplies four outputs to a clock signal selector 16, which supplies an output to a clock signal regenerator 17 from which the required output clock signal is derived and supplied to an output terminal 18. To the synchronizer 15 are also supplied inverted input clock signals $\overline{A}$ to $\overline{D}$ via respective input terminals 19 to 22, and to the clock signal selector 16 are also supplied the four input clock signals A to D via respective input terminals 23 to 26.

The operation will now be described with reference also to FIG. 2 which shows the waveforms at various points in the clock signal multiplexer of FIG. 1, these points being designated with the corresponding figure numbers.

The pulse generator 5, for example, receives as inputs the clock signal A (FIG. 2A) and the clock enable signal A (FIG. 2B) which is active low. The output of the pulse generator 5 is a clock enable pulse (FIG. 2C). The output of the pulse generator 5 is normally low, and it produces a high pulse (FIG. 2C) on the negative edge of the input clock enable signal A. The pulse duration is one clock cycle of the system. The pulse generators 6 to 8 operate similarly for the input clock signals B to D. The required function of each of the pulse generators 5 to 8 can, for example, be realised using flip-flop circuits and NOR gates.

The logic circuit 13 receives as inputs the clock enable signals A to D (for example FIG. 2B) which are active low, and the clock enable pulses (for example FIG. 2C) from the pulse generators 5 to 8. The output signal is a control signal pulse (FIG. 2D). The logic circuit 13 supplies one output signal for each input clock enable signal A to D. Each output signal is normally high, but a low control signal pulse (FIG. 2D) is produced on a given one of the four outputs in response to a high pulse on the respective clock enable pulse input, provided that all the input clock enable signals (A to D) not relating to the given output are high. The required function of the logic circuit 13 can, for example, be realised using NAND gates.

The control signal selector 14 receives as inputs the control signal pulses (FIG. 2D) from the logic circuit 13, corresponding to the input clock signals A to D, and it supplies output control signals (for example FIG. 2G), there being one for each of the input clock signals A to D. For a given input control signal pulse (FIG. 2D), the control signal selector 14 produces a low control signal (for example FIG. 2E) on the respective output in response to low on the respective input. At the same time, it causes all the other output control signals to go high. The required function of the control signal selector 14 can, for example, be realised using flip-flop circuits and AND gates.

The synchronizer 15 receives as inputs the four control signals (for example FIG. 2E) from the control signal selector 14 and also the four inverted input clock signals $\overline{A}$ to $\overline{D}$. The outputs are four synchronized control signals (for example FIG. 2F). The synchronizer 15 thus synchronizes the input control signal to the falling edge of the respective input clock signal A to D. The required function of the synchronizer 15 can, for example, be realised using flip-flop circuits.

The clock signal selector 16 is basically a multiplexer and receives as inputs the four synchronized control signals (for example FIG. 2F) from the synchronizer 15 and the input clock signals A to D. The output is an intermediate output clock signal (FIG. 2G). Thus the clock signal selector 16 combines the input clock signals A to D according to the input synchronized control signals (for example FIG. 2F). The required function of the clock signal selector 16 can, for example, be realised using AND gates and OR gates.

Figure 2:
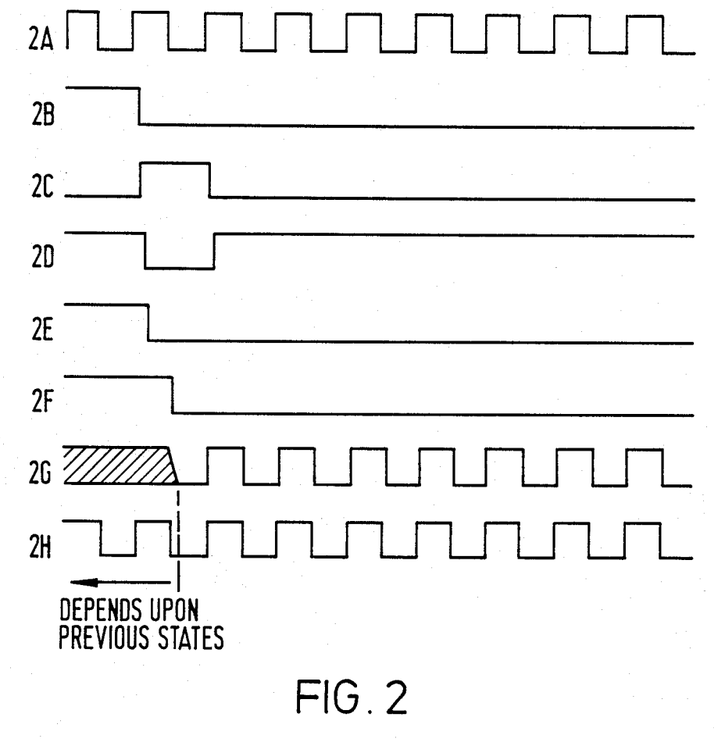
FIG. 2 shows waveforms of signals at various points in the circuit of FIG. 1.

The clock signal regenerator 17 receives as an input the intermediate output clock signal (FIG. 2G) from the clock signal selector 16, and supplies as an output the output clock signal (FIG. 2H). The clock signal regenerator 17 maintains the required mark/space ratio of the output clock signal and removes glitches.

Figure 3:
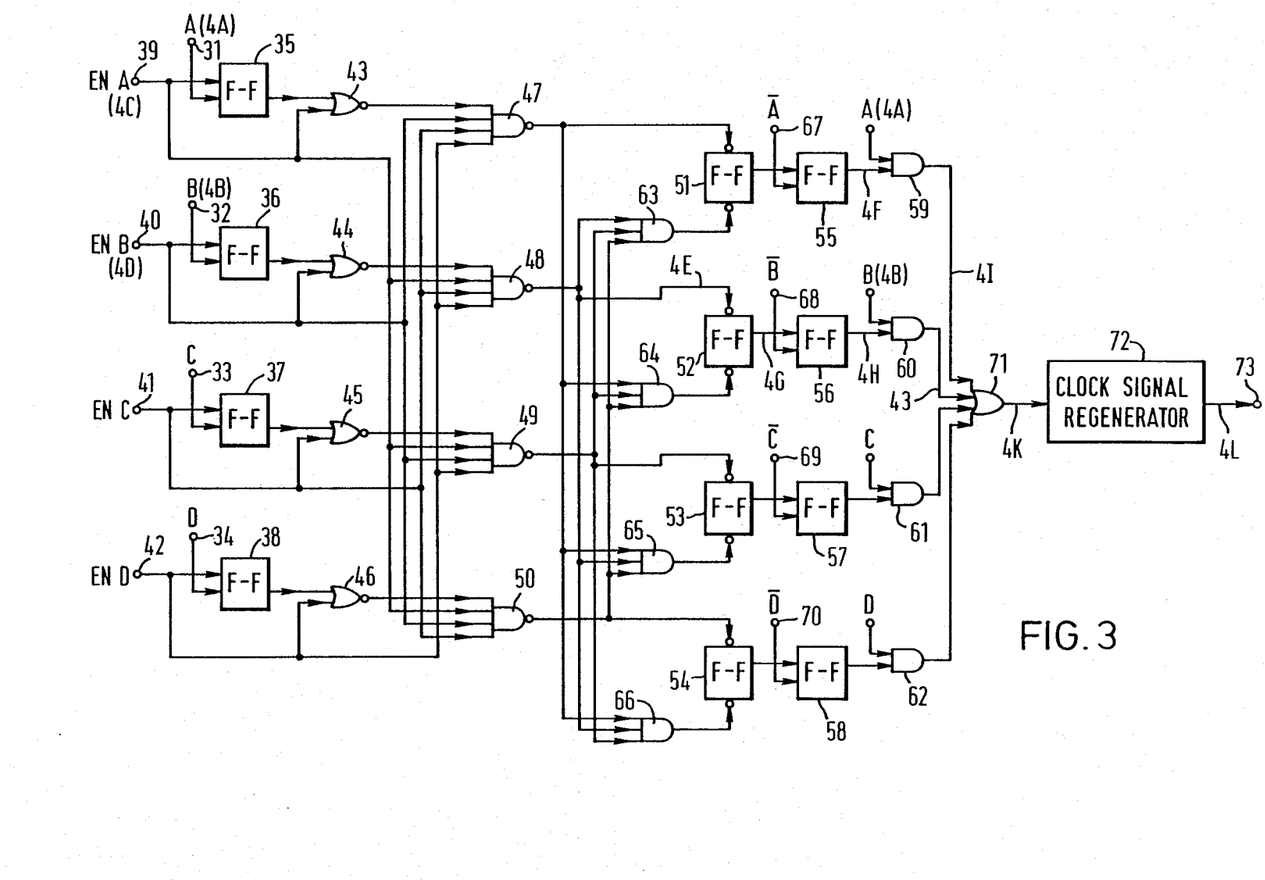
FIG. 3 shows in block form a second embodiment of clock signal multiplexer according to the present invention.

The output clock signal is thus continuous and always contains complete clock cycles even when there is a transition from one input clock signal to another. This latter point will be more fully described in relation to the second embodiment, which is shown in FIG. 3 and which will now be described. In the second embodiment the individual circuits of the clock signal multiplexer are shown in more detail, but it is emphasized that this is only by way of example as the required functions can be realised in other ways.

The second embodiment of clock signal multiplexer comprises four input terminals 31 to 34 to which the input clock signals A to D respectively are supplied, and which are respectively connected to the clock terminals of four D-type flip-flop circuits 35 to 38. To the D input terminals of the flip-flop circuits 35 to 38 are respectively connected four further input terminals 39 to 42 to which are respectively supplied clock enable signals A to D which, as explained below, control selection of which of the clock signals A to D is to form the output clock signal of the clock signal multiplexer. Respectively associated with the flip-flop circuits 35 to 38 are four two-input NOR gates 43 to 46 and four four-input NAND gates 47 to 50. The $\overline{Q}$ output terminals of the flip-flop circuits 35 to 38 are respectively connected to one input of the associated one of the NOR gates 43 to 46, the outputs of which are respectively connected to one input of the associated one of the NAND gates 47 to 50. The further input terminals 39 to 42 are also respectively connected to the other input terminal of the associated one of the NOR gates 43 to 46, and to a respective one of the input terminals of each of the three non-associated NAND-gates 47 to 50. The flip-flop circuit 35 and the NOR gate 43, for example, form a pulse generator, and the NAND gates 47 to 50 form a combinational logic circuit.

The output of the NAND gate 47 is connected to the set terminal of a D-type flip-flop circuit 51, the Q output terminal of which is connected to the D input terminal of a D-type flip-flop circuit 55, the Q output terminal of which is connected to one input of a two-input AND gate 59. The outputs of the NAND gates 48, 49 and 50 are similarly connected to similarly-connected D-type flip-flop circuits and two-input AND gates 52, 56 and 60; 53, 57 and 61; and 54, 58 and 62, respectively. Four three-input AND gates 63 to 66 have their outputs connected to the clear terminals of the flip-flop circuits 51 to 54, respectively. The outputs of the NAND gates 47 to 50 are also connected to the respective inputs of the AND gates 64, 65 and 66; 65, 66 and 63; 66, 63 and 64; and 63, 64 and 65, respectively. The input terminals 31 to 34 are respectively connected to the other input terminals of the AND gates 59 to 62. Four further input terminals 67 to 70 to which inverted input clock signals $\overline{A}$ to $\overline{D}$ respectively are supplied, are respectively connected to the clock terminals of the flip-flop circuits 55 to 58. The outputs of the AND gates 59 to 62 are respectively connected to the four inputs of an OR gate 71, the output of which is connected by way of a clock signal regenerator 72 to an output terminal 73.

The flip-flop circuits 51 to 54 and the AND gates 63 to 66 form a control signal selector, the flip-flop circuits 55 to 58 form a synchronizer, and the AND gates 59 to 62 and the OR gate 71 form a clock signal selector.

The operation will now be described with reference also to FIG. 4, which shows the waveforms of signals 4A to 4L at various similarly-designated points in the circuit of FIG. 3. The operation will be described in particular for use two of the input clock signals A to D, but from this the way in which the circuit operates for all four (or for any different plurality of input clock signals) will be readily apparent.

The two input clock signals A and B (FIGS. 4A and 4B) are supplied to the input terminals 31 and 32 respectively, and are of the same frequency but differ in phase. Associated with each of the four input clock signals A to D is a respective one of four clock enable signals A to D which are independent of each other, and are active when low. That is, any or none of the clock enable signals A to D may be low at any given time, and at any given time the one of the clock enable signals A to D which has most recently gone low designates the one of the input clock signals A to D which is required to form the output of the multiplexer. The clock enable signals A and B (FIGS. 4C and 4D) are supplied to the further input terminals 39 and 40 respectively.

A transition between the input clock signal A (FIG. 4A) and the input clock signal B (FIG. 4B) will be considered. As initially the input clock signal A (FIG. 4A) has been supplied to the output terminal 73, the clock enable signal A (FIG. 4C) must have been low and the other clock enable signals B (FIG. 4D), C and D must have been high. The clock enable signals C and D must remain high during the transition to be described. With the clock enable signal A (FIG. 4C) low, the outputs of the NAND gates 48 to 50 are held high, and as a result the clock enable signals B (FIG. 4D), C and D are prevented from causing the input clock signals B (FIG. 4B), C and D from being supplied to the output terminal 73. It is therefore necessary for the clock enable signal A (FIG. 4C) to go high, that is inactive, as shown in FIG. 4, before the transition to the input clock signal B (FIG. 4B) can take place.

Figure 4:
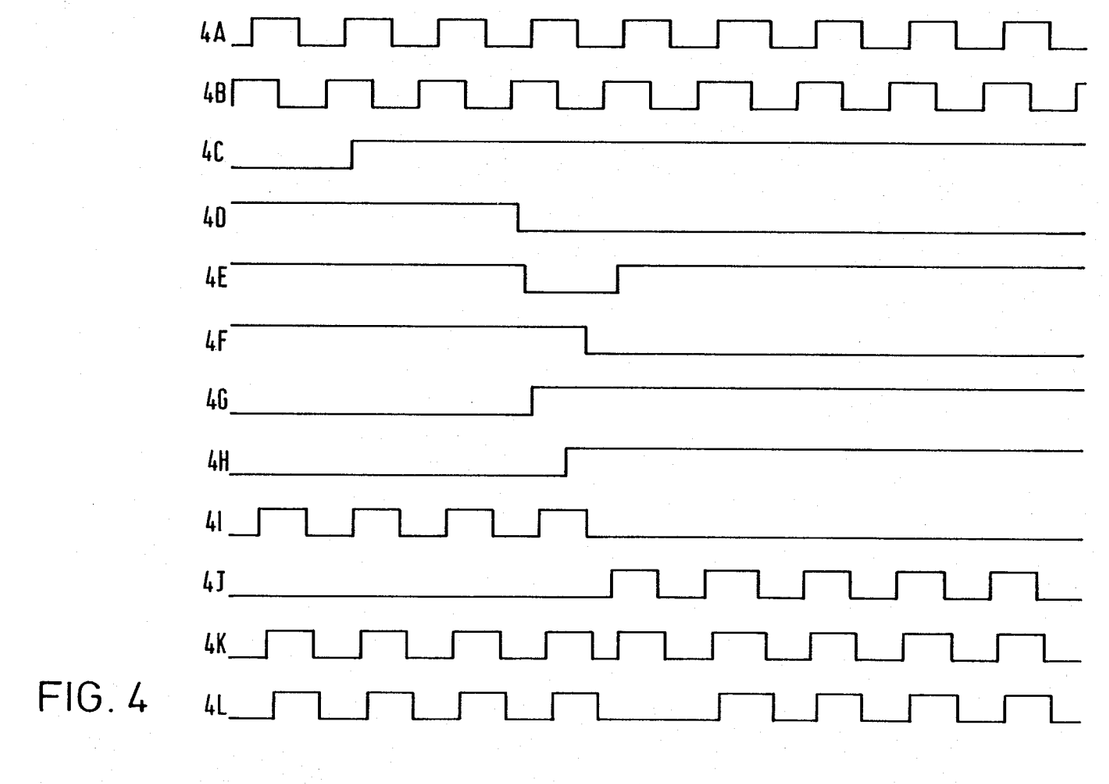
FIG. 4 shows waveforms of signals at various points in the circuit of FIG. 3.

At a later time, as shown in FIG. 4, the clock enable signals B (FIG. 4D) goes low, signalling a request for a transition to the input clock signal B (FIG. 4B). The flip-flop circuit 36 operates as a latch circuit and in cooperation with the NOR gate 44 causes a single positive pulse, with a duration of one input clock signal B (FIG. 4B) cycle long, to be generated following the negative edge of the clock enable signal B (FIG. 4D). This pulse will pass through the NAND gate 48 and become a single negative pulse 4E.

The effect of the pulse 4E is two-fold. Firstly, via the AND gate 63 it will cause the flip-flop circuit 51 to be cleared. The output of the flip-flop circuit 51 will go low and the flip-flop circuit 55 will then be clocked by a negative edge of the inverted input clock signal $\overline{A}$ to cause the output signal 4F of the flip-flop circuit 55 to go low. Since this signal 4F and the input clock signal A (FIG. 4A) are gated together by the AND gate 59, the result of the signal 4F going low is to de-select the input clock signal A (FIG. 4A) and take the signal 4I supplied by the AND gate 59 to the OR gate 71 low. Secondly, this signal 4E sets the flip-flop circuit 52 so that the output signal 4G goes high. The next negative edge of the inverted input clock signal $\overline{B}$ will cause the output signal 4H of the flip-flop circuit 56 also to go high. The signal 4H enables the AND gate 60 to supply the input clock signal B (FIG. 4B) to the OR gate 71 as the signal 4J. Thus, the input clock signal A (FIG. 4A) will have been de-selected and the input clock signal B (FIG. 4B) will have been selected, so that the output signal 4K from the OR gate 71 will have changed from the input clock signal A (FIG. 4A) to the input clock signal B (FIG. 4B).

However, as seen in FIG. 4, the result of the input clock signals A and B (FIGS. 4A and 4B) being out of phase is that the signal 4K contains a reduced space period. As this could well cause a problem in subsequent circuitry, the signal 4K is supplied to the clock signal regenerator 72 which operates to maintain the mark/space ratio of the output signal 4L within predetermined bounds.

From the above description it will be understood how the multiplexer operates in the case of a transition from the input clock signal A to the input clock signal B, but it will also be readily apparent how transitions can occur from any one of the input clocks A to D to any other one of the input clock signals A to D. In each case, the selection of the previously-selected input clock signal A to D is relinquished by the corresponding clock enable signal A to D going high, and a new input clock signal A to D is selected by the corresponding clock enable signal A to D going low.

Figure 5:
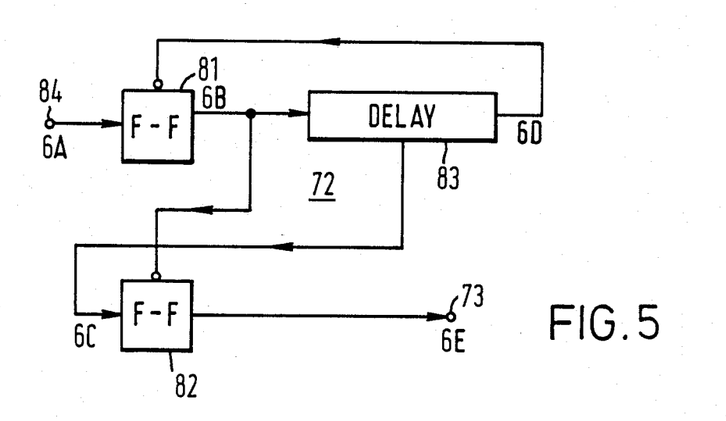
FIG. 5 shows part of the clock signal multiplexer of FIG. 3 in more detailed block form.
Figure 6:
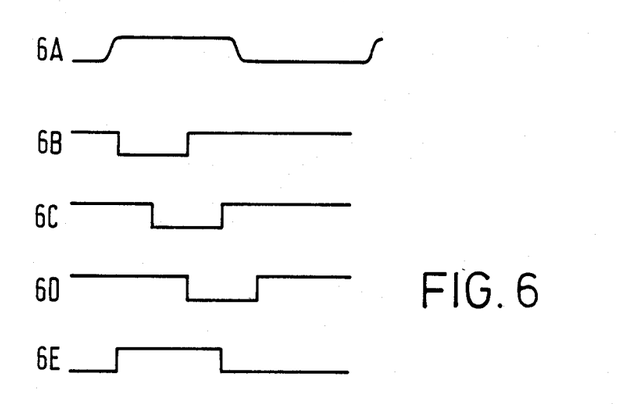
FIG. 6 shows waveforms of signals at various points in the circuit of FIG. 5.

One example of the clock signal regenerator 72 will now be described with reference to FIGS. 5 and 6. As shown in FIG. 5, the clock signal regenerator 72 comprises D-type flip-flop circuits 81 and 82 and a delay line 83 which produces a total delay of 30 nanoseconds with an intermediate tap at 15 nanoseconds. The output of the OR gate 71 (FIG. 3) is connected to an input terminal 84, which is connected to the clock terminal of the flip-flop circuit 81. The Q output terminal of the flip-flop circuit 81 is connected to the input of the delay line 83 and also to the set terminal of the flip-flop circuit 82. The output tap of the delay line 83 is connected to the set terminal of the flip-flop circuit 81, and the intermediate tap of the delay line 83 is connected to the clock terminal of the flip-flop circuit 82. The Q output terminal of the flip-flop circuit 82 is connected to the output terminal 73 of the clock signal multiplexer (FIG. 3). Alternatively, the $\overline{Q}$ output terminal of the flip-flop circuit 82 can be used to supply the output, or indeed both the Q and the $\overline{Q}$ output terminals may be used if required.

The operation of the clock signal regenerator 72 will now be described with reference also to FIG. 6, which shows the waveforms of signals 6A to 6E at various similarly-designated points in the circuit of FIG. 5.

A pulse signal 6A is supplied by the OR gate 71 (FIG. 3) to the terminal 84 and in consequence the flip-flop circuit 81 supplies a pulse 6B, the leading edge of which is delayed by say 6 nanoseconds relative to the positive edge of the pulse signal 6A, due to the delay inherent in the flip-flop circuit 81. The negative edge of a pulse 6C supplied from the intermediate tap of the delay line 83 to the flip-flop circuit 82 is delayed by a further 15 nanoseconds, while the negative edge of a pulse 6D which sets the flip-flop circuit 81 is delayed by 30 nanoseconds relative to the negative edge of the pulse 6B. Considering therefore an output pulse 6E, the positive edge of the output pulse 6E is set by the negative edge of the pulse 6B, and the negative edge of the output pulse 6E is set by the positive edge of the pulse 6C. The mark period is therefore the interval between the above two times, that is:

(15+30)+6 nanoseconds that is:

51 nanoseconds.

Thus, it will be seen that the mark/space ratio of the output clock signal is determined exclusively by the clock signal regenerator circuit 72, and not by the pulse signal 6A.

Various modifications are of course possible without departing from the invention as defined by the appended claims. Thus, for example, the frequency and times quoted above are given by way of example only, as are the number of input clock signals, and various modifications can be made to the circuit elements used, for example other suitable forms of a latch circuit can be used in place of the flip-flop circuits mentioned.

I claim:

1. A clock signal multiplexer for combining a plurality of input clock signals of the same frequency but differeing phases into a single channel, by selectively passing one of said input clock signals to an output of the multiplexer to the exclusion of all of the other input clock signals in response to a corresponding clock enable signal in a select condition, the multiplexer comprising:
    a plurality of input circuits each of which receives a respective one of said input clock signals and a corresponding one of a plurality of clock enable signals;
    a signal synchronizer;
    a logic circuit for coupling said input circuits to said signal synchronizer, and including means for enabling said signal synchronizer to pass the input clock signal corresponding to that one of said clock enable signals which is in a select condition and for disabling said signal synchronizer so as not to pass the selected input clock signal on return of said corresponding one of said clock enable signals to a non-select condition and transition of another of said clock enable signals to the select condition, and for enabling said signal synchronizer to pass the next selected input clock signal corresponding to said another clock enable signal;
    a clock signal regenerator; and
    a clock signal selector connected to receive said input clock signals and connected to said signal synchronizer, whereby the signal synchronizer enables said clock signal selector to pass the selected input clock signal to said clock signal regenerator;
    said clock signal regenerator comprising first and second flip-flops and signal delay means, said second flip-flop having set and clock terminals and said first flip-flop being connected to receive said selected input clock signal and to supply a pulse in response thereto to said delay means and to one of said set and clock terminals of said second flip-flop, and said delay means producing an output supplied to the other of said set and clock terminals of said second flip-flop;
    whereby said second flip-flop produces a signal which is supplied to said output of said multiplexer and has a mark/space ratio determined exclusively by said clock signal regenerator and not by said selected input clock signal.

2. A clock signal multiplexer according to claim 1 wherein said plurality of input circuits respectively comprise a corresponding plurality of pulse generators respectively including a corresponding plurality of first latch circuits to each of which a respective one of said plurality of input clock signals is supplied together with a respective clock enable signal, wherein said signal synchronizer comprises a corresponding plurality of second latch circuits and wherein said logic circuit comprises an arrangement of gates coupling said first latch circuits to said second latch circuits of said signal synchronizer, said gate arrangement for enabling a selected one only of said second latch circuits corresponding to that one of said plurality of clock enable signals which is in a select condition and for disabling said selected one of said second latch circuits on return of said one of said clock enable signals to a non-select condition and transition of another of said clock enable signals to the select condition and for enabling another of said second latch circuits corresponding to said another clock enable signal, and wherein said clock signal selector comprises a corresponding plurality of output gates to each of which a respective one of said input clock signals is supplied and to which said second latch circuits are respectively connected, said enabled latch circuit enabling the corresponding output gate to pass the enabled said input clock signal to said output of the multiplexer.

3. A clock signal multiplexer for combining a plurality of input clock signals of the same frequency but differing phases into a single channel, by selectively passing one of said input clock signals to an output of the multiplexer to the exclusion of all of the other input clock signals in response to a corresponding clock enable signal in a select condition, the multiplexer comprising:
    a plurality of input circuits each of which receives a respective one of said input clock signals and a corresponding one of a plurality of clock enable signals;
    a signal synchronizer;
    a logic circuit for coupling said input circuits to said signal synchronizer, and including means for enabling said signal synchronizer to pass the input clock signal corresponding to that one of said clock enable signals which is in a select condition and for disabling said signal synchronizer so as not to pass the selected input clock signal on return of said corresponding one of said clock enable signals to a non-select condition and transition of another of said clock enable signals to the select condition, and for enabling said signal synchronizer to pass the next selected input clock signal corresponding to said another clock enable signal; and
    a clock signal selector connected to receive said input clock signals and connected to said signal synchronizer, whereby the signal synchronizer enables said clock signal selector to pass the selected input clock signal to said output of the multiplexer;
    wherein said plurality of input circuits respectively comprise a corresponding plurality of pulse generators respectively including a corresponding plurality of first latch circuits to each of which a respective one of said plurality of said input clock signals is supplied together with a respective clock enable signal, wherein said signal synchronizer comprises a corresponding plurality of second latch circuits and wherein said logic circuit comprises an arrangement of gates coupling said first latch circuits to said second latch circuits of said signal synchronizer, said gate arrangement for enabling a selected one only of said second latch circuits corresponding to that one of said plurality of clock enable signals which is in a select condition and for disabling said selected one of said second latch circuits on return of said one of said clock enable signals to a non-select condition and transition of another of said clock enable signals to the select condition and for enabling another of said second latch circuits corresponding to said another clock enable signal, and wherein said clock signal selector comprises a corresponding plurality of output gates to each of which a respective one of said input clock signals is supplied and to which said second latch circuits are respectively connected, said enabled latch circuit enabling the corresponding output gate to pass the enabled said input clock signal to said output of the multiplexer; wherein the outputs of said output gates are connected to a clock signal regenerator, the output of which constitutes said output of the multiplexer.

4. A clock signal multiplexer for combining a plurality of input clock signals of the same frequency but differing phases into a single channel, by selectively passing one of said input clock signals to an output of the multiplexer to the exclusion of all of the other input clock signals in response to a corresponding clock enable signal in a select condition, the multiplexer comprising:

a plurality of input circuits each of which receives a respective one of said input clock signals and a corresponding one of a plurality of clock enable signals;

a signal synchronizer;

a logic circuit for coupling said input circuits to said signal synchronizer, and including means for enabling said signal synchronizer to pass the input clock signal corresponding to that one of said clock enable signals which is in a select condition and for disabling said signal synchronizers so as not to pass the selected input clock signal on return of said corresponding one of said clock enable signals to a non-select condition and transition of another of said clock enable signals to the select condition, and for enabling said signal synchronizer to pass the next selected input clock signal corresponding to said another clock enable signal; and a clock signal selector connected to receive said input clock signals and connected to said signal synchronizer, whereby the signal synchronizer enables said clock signal selector to pass the selected input clock signal to said output of the multiplexer;

wherein said plurality of input circuits respectively comprise a corresponding plurality of pulse generators respectively including a corresponding plurality of first latch circuits to each of which a respective one of said plurality of said input clock signals is supplied together with a respective clock enable signal, wherein said signal synchronizer comprises a corresponding plurality of second latch circuits and wherein said logic circuit comprises an arrangement of gates coupling said first latch circuits to said second latch circuits of said signal synchronizer, said gate arrangement for enabling a selected one only of said second latch circuits corresponding to that one of said plurality of clock enable signals which is in a select condition and for disabling said selected one of said second latch circuits on return of said one of said clock enable signals to a non-select condition and transition of another of said clock enable signals to the select condition and for enabling another of said second latch circuits corresponding to said another clock enable signal, and wherein said clock signal selector comprises a corresponding plurality of output gates to each of which a respective one of said input clock signals is supplied and to which said second latch circuits are respectively connected, said enabled latch circuit enabling the corresponding output gate to pass the enabled said input clock signal to said output of the multiplexer; wherein each of said first latch circuits is a respective flip-flop circuit.

5. A clock signal multiplexer for combining a plurality of input clock signals of the same frequency but differing phases into a single channel, by selectively passing one of said input clock signals to an output of the multiplexer to the exclusion of all of the other input clock signals in response to a corresponding clock enable signal in a select condition, the multiplexer comprising:

a plurality of input circuits each of which receives a respective one of said input clock signals and a corresponding one of a plurality of clock enable signals;

a signal synchronizer;

a logic circuit for coupling said input circuits to said signal synchronizer, and including means for enabling said signal synchronizer to pass the input clock signal corresponding to that one of said clock enable signals which is in a select condition and for disabling said signal synchronizers so as not to pass the selected input clock signal on return of said corresponding one of said clock enable signals to a non-select condition and transition of another of said clock enable signals to the select condition, and for enabling said signal synchronizer to pass the next selected input clock signal corresponding to said another clock enable signal; and a clock signal selector connected to receive said input clock signals and connected to said signal synchronizer, whereby the signal synchronizer enables said clock signal selector to pass the selected input clock signal to said output of the multiplexer;

wherein said plurality of input circuits respectively comprise a corresponding plurality of pulse generators respectively including a corresponding plurality of first latch circuits to each of which a respective one of said plurality of said input clock signals is supplied together with a respective clock enable signal, wherein said signal synchronizer comprises a corresponding plurality of second latch circuits and wherein said logic circuit comprises an arrangement of gates coupling said first latch circuits to said second latch circuits of said signal synchronizer, said gate arrangement for enabling a selected one only of said second latch circuits corresponding to that one of said plurality of clock enable signals which is in a select condition and for disabling said selected one of said second latch circuits on return of said one of said clock enable signals to a non-select condition and transition of another of said clock enable signals to the select condition and for enabling another of said second latch circuits corresponding to said another clock enable signal, and wherein said clock signal selector comprises a corresponding plurality of output gates to each of which a respective one of said input clock signals is supplied and to which said second latch circuits are respectively connected, said enabled latch circuit enabling the corresponding output gate to pass the enabled said input clock signal to said output of the multiplexer; wherein each of said second latch circuits comprises a respective pair of flip-flop circuits.

6. A clock signal multiplexer according to claim 1 wherein the plurality is four.

* * * * *

UNITED STATES PATENT AND TRADEMARK OFFICE
CERTIFICATE OF CORRECTION

PATENT NO. : 4,820,992
DATED : April 11, 1989
INVENTOR(S) : Richard J.A. Avis

It is certified that error appears in the above-identified patent and that said Letters Patent is hereby corrected as shown below:

In the Abstract, line 6, change "includes" to --comprises--
　　　　　　　　　line 7, after "input" insert --clock--;
　　　　　　　　　line 15, after "clock" insert --enable--.
Column 1, line 15, after "stored" insert --in--;
　　　　　line 27, change "signal" to --single--;
　　　　　line 66, after "clock" insert --enable--;
　　　　　line 68, change "signal" first occurence to --signals--.
Column 4, line 30, before "clock" insert --input--.
Column 5, line 47, change "signals" to --signal--.

IN CLAIMS:

Column 7, line 24, change "differeing" to --differing--.

Signed and Sealed this

Seventeenth Day of October, 1989

Attest:

DONALD J. QUIGG

*Attesting Officer*　　　　　*Commissioner of Patents and Trademarks*